United States Patent Office 3,056,815
Patented Oct. 2, 1962

3,056,815
2α-METHYL-6-CHLORO-PREGNANE-DERIVATIVES
Howard J. Ringold, Octavio Mancera, and George Rosenkranz, all of Mexico City, Mexico, assignors, by mesne assignments, to Syntex Corporation, a corporation of Panama
No Drawing. Filed Oct. 13, 1958, Ser. No. 766,708
Claims priority, application Mexico Oct. 15, 1957
14 Claims. (Cl. 260—397.45)

The present invention relates to cyclopentanophenanthrene compounds and to a process for the production thereof.

More particularly the present invention relates to 2-methyl-6α-chloro-prednisone, 2-methyl-6α-chloro-9α-fluoro-prednisone, 2-methyl-6α-chloro-prednisolone and 21-monoesters of these compounds of hydrocarbon carboxylic acids of less than 12 carbon atoms. All of the compounds just enumerated are potent cortical hormones having anti-inflammatory properties.

In accordance with the present invention it has been discovered that the aforementioned compounds may be prepared from 2α-methyl-cortisone acetate or 2α-methyl-9α-fluoro-cortisone acetate or from the 21-acetate of 2α-methyl-Δ⁴-pregnen-17α,21-diol-3,20-dione (2α-methyl-"S") by preparing the 3-enol-ether of these compounds treating the enol ether with hypochlorous acid to form the 2α-methyl-6β-chloro intermediates and inverting the 6β-chloro group with dry hydrogen chloride in acetic acid. The 1(2)-double bond is then introduced by the action of selenium dioxide and to prepare the prednisolone type compounds the "S" type intermediates are conventionally treated with *Curvularia lunata* to introduce the 11β-hydroxy group. By conventional esterification the aforementioned esters are then prepared.

Certain of the novel final products and novel intermediates of the present invention are illustrated by the following formula:

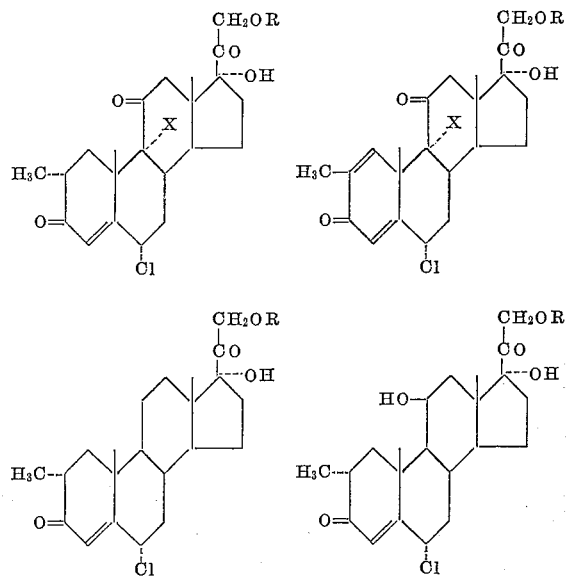

and

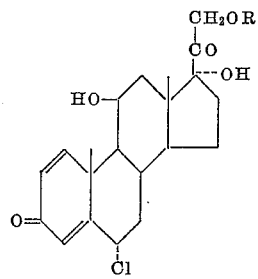

In the above formulas R represents hydrogen or R represents an acyl group of a hydrocarbon carboxylic acid of less than 12 carbon atoms. These acyl groups as is well known in the art may be saturated or unsaturated, straight or branched chain aliphatic, cyclic or mixed cyclic-aliphatic. They may be conventionally substituted as by halogen or methoxy. Typical acyl groups are acetate, propionate, cyclopentylpropionate, benzoate, β-chloropropionate, monosuccinate etc. X represents hydrogen or fluoro.

The novel compounds above set forth are prepared by a process illustrated in part by the following equation:

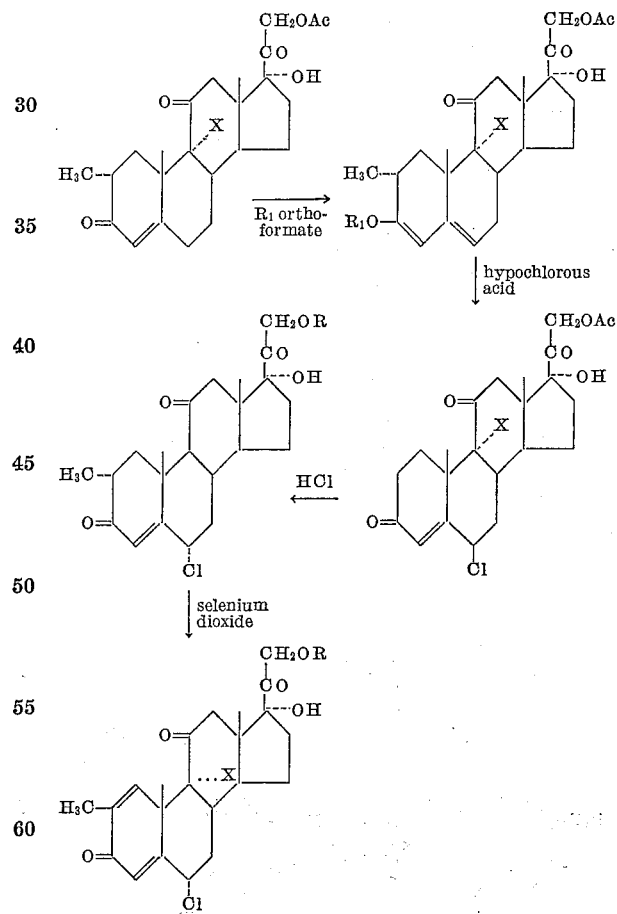

In the above equation R and X represent the same groups as heretofore. $R_1$ represents lower alkyl and Ac represents acetate.

In practicing the process above set forth the 21-acetate of 2α-methyl-cortisone or of 2α-methyl-9α-fluoro-cortisone in an organic solvent was treated with a lower alkyl orthoformate to form the corresponding 3-lower alkyl enol ether. These ethers were then treated with the elements of hypochlorous acid preferably by reaction of an aqueous acetone solution of the ether with N-chlorosuccinimide in the presence of sodium acetate and acetic acid. The resultant compounds namely the 21-acetates of 2α-methyl-6β-chloro-cortisone and of 6β-chloro-9α-fluoro-cortisone are then treated with anhydrous hydrogen chloride in glacial acetic acid at a low temperature to prepare the corresponding 6α-chloro compounds. Conventional saponification of these compounds gave the free 2α-methyl-6α-chloro-cortisone and 2α-methyl-9α-fluoro-6α-chloro-cortisone. Conventional esterification of these compounds with an acid anhydride of a hydrocarbon carboxylic acid of less than 12 carbon atoms gave the 21-mono esters indicated by R as previously defined. Treatment of these esters or the free compounds with selenium dioxide preferably by refluxing in the presence of anhydrous t-butanol and pyridine gave the corresponding 1-dehydro compounds. Preferably the esters were used for this reaction and the products namely the 2-methyl-6α-chloro-prednisone esters or 2-methyl-6α-chloro-9α-fluoro-prednisone esters were converted to the free compounds by conventional saponification.

Another portion of the process of the present invention is illustrated by the following equation:

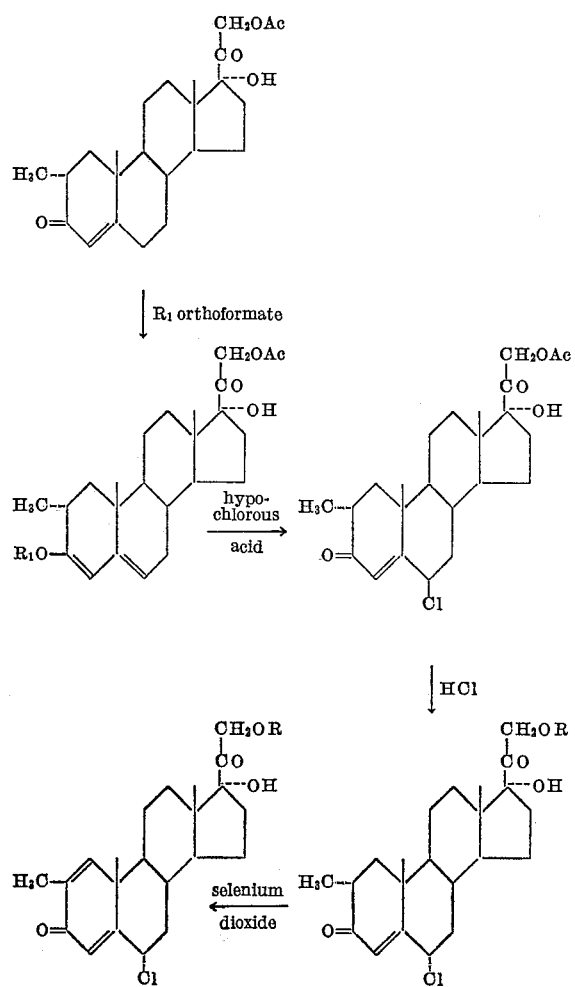

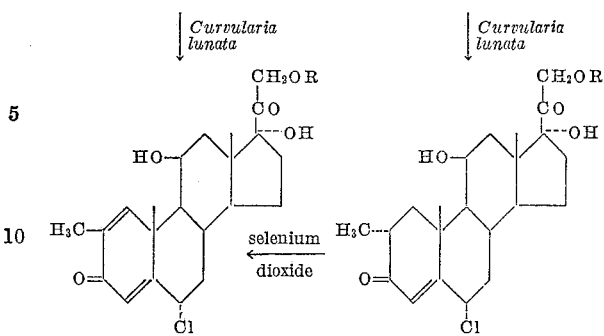

In the above equation $R_1$, R and Ac represent the same groups as heretofore set forth.

As indicated above the starting material for this portion of the process of the present invention was the 21-acetate of 2α-methyl-Δ⁴-pregnen-17α,21-diol-3,20-dione (21-acetate of 2α-methyl-"S") disclosed and claimed in U.S. patent application Serial No. 636,858, filed January 29, 1957. This compound upon treatment with a lower alkyl orthoformate under the conditions previously described gives the corresponding 3-lower alkyl enol ether; treatment with hypochlorous acid gives 6β-chloro compound which is inverted with HCl to the 6α-chloro derivative i.e. the 21-acetate of 2α-methyl-6α-chloro "S." This last acetate is saponified to the free compound and conventionally esterified to give the esters indicated. If the next step is dehydrogenation at C-1(2) the esters are used and if the next step is the addition of an 11β-hydroxy group the free compound is most suitable. For the addition of the 11β-hydroxy the compound is reacted with *Curvularia lunata* according to the process described in U.S. Patent No. 2,658,023, Shull et al., granted November 3, 1953. As indicated in the above equation either step may be performed first with the production of 2α-methyl-6α-chloro-Δ¹,⁴-pregnadien-17α,21-diol-3,20-dione and its esters, 2α-methyl-6α-chloro-Δ⁴-pregnen-11β,17α,21-triol-3,20-dione and its esters and finally 2α-methyl-6α-chloro-prednisolone and its esters. As may be understood following the reaction with *Curvularia lunata* the resultant free compound may be conventionally esterified and following the reaction with selenium dioxide the resultant ester compound may be conventionally saponified.

The following specific examples serve to illustrate but are not intended to limit the present invention.

*Example I*

A suspension of 6 g. of the 21-acetate of 2α-methyl-cortisone in a mixture of 7 cc. of ethyl orthoformate, 0.4 cc. of anhydrous ethanol and 30 cc. of anhydrous dioxane was treated with 0.5 cc. of dioxane containing 0.075 cc. of concentrated sulfuric acid and the mixture was rapidly stirred for 5 minutes. It was then kept standing for 20 minutes at 25° C., treated with 3 cc. of pyridine and evaporated to dryness under reduced pressure. The residue crystallized upon trituration with 5 cc. of methanol containing a few drops of water. Recrystallization from methanol containing a little pyridine furnished the 21-acetate of 2α-methyl-3-ethoxy-Δ³,⁵-pregnadien-17α,21-diol-11,20-dione.

5 g. of this enol-ether was mixed with 100 cc. of acetone, 20 cc. of water and 2 g. of sodium acetate, cooled to 0° C. and treated with 1.8 g. of N-chlorosuccinimide followed by 2 cc. of glacial acetic acid. After stirring for one hour at 0° C. the mixture was poured into water and the precipitate was collected, washed with water, dried and recrystallized from ether, thus producing the 21-acetate of 2α-methyl-6β-chloro-cortisone.

A slow stream of dry hydrogen chloride was allowed to pass into a solution of 3 g. of the above compound in 150 cc. of glacial acetic acid while the temperature was kept below 18° C. After 2 hours, the solution was poured into water, the precipitate was collected by filtration, washed with water and recrystallized from acetone-hexane. There was thus obtained the 21-acetate of 2α-methyl-6α-chloro-cortisone.

A mixture of 2 g. of the 21-acetate of 2α-methyl-6α-chloro-cortisone, 100 cc. of anhydrous t-butanol, 0.8 g. of selenium dioxide and 0.5 cc. of pyridine was refluxed under nitrogen for 18 hours, cooled and filtered through celite. The precipitate was washed with 20 cc. of hot t-butanol and the combined filtrate and washings was evaporated to dryness under reduced pressure. The residue was dissolved in 50 cc. of acetone, treated with decolorizing charcoal and anhydrous sodium sulfate, filtered and evaporated to dryness. Chromatographic purification of the residue on neutral alumina yielded the 21-acetate of 2-methyl-6α-chloro-prednisone.

*Example II*

By the method of Example I, the 21-acetate of 2α-methyl-9α-fluoro-cortisone was converted into the 21-acetates of 2α-methyl-9α-fluoro-3-ethoxy-$\Delta^{3,5}$-pregnadien-17α,21-diol-11,20-dione, of 2α-methyl-6β-chloro-9α-fluoro-cortisone and of 2α-methyl-6α-chloro-9α-fluoro-cortisone, as intermediate products; the final compound was the 21-acetate of 2-methyl-6α-chloro-9α-fluoro-prednisone.

*Example III*

1 g. of the 21-acetate of 2α-methyl-6α-chloro-cortisone was mixed with 10 cc. of absolute methanol, cooled to 0° C. and treated with a cold solution of sodium methoxide prepared by dissolving 70 mg. of sodium metal in 5 cc. of absolute methanol; the reagent was added dropwise to the stirred solution which was kept under nitrogen at a temperature around 0° C. The stirring was continued under nitrogen for half an hour at 0° C. and the mixture was then poured into cold saturated aqueous sodium chloride solution containing 0.5 cc. of acetic acid. The precipitate was collected, washed with water, dried and recrystallized from acetone-hexane, thus yielding the free 2α-methyl-6α-chloro-cortisone.

*Example IV*

By the method of Example III, there were saponified the 21-acetates of 2-methyl-6α-chloro-prednisone, of 2α-methyl-6α-chloro-9α-fluoro-cortisone and of 2-methyl-6α-chloro-9α-fluoro-prednisone to produce the corresponding free 21-hydroxy compounds.

*Example V*

A mixture of 1 g. of 2-methyl-6α-chloro-prednisone, 10 cc. of pyridine and 1 cc. of propionic anhydride was kept overnight at room temperature and then poured into water. The precipitate formed was collected, washed with water, dried and recrystallized from acetone-hexane, thus giving the 21-propionate of 2-methyl-6α-chloro-prednisone. By the same method other esters of hydrocarbon carboxylic acids of less than 12 carbon atoms were prepared including the cyclopentylpropionate, and benzoate.

*Example VI*

By the method of Example V, 2α-methyl-6α-chloro-cortisone, 2α-methyl-6α-chloro-9α-fluoro-cortisone and 2-methyl-6α-chloro-9α-fluoro-prednisone was esterified at C-21 to make the propionate, cyclopentylpropionate and benzoate.

*Example VII*

1 g. of the 21-propionate of 2α-methyl-6α-chloro-9α-fluoro-cortisone, obtained in accordance with the method of Example V, was dehydrogenated with selenium dioxide as described for this reaction in Example I, to form the 21-propionate of 2-methyl-6α-chloro-9α-fluoro-prednisone.

Similarly, the dehydrogenation of the other C-21 esters of Example VI of 2-methyl-6α-chloro-cortisone or its C-9α fluoro analogue produced the corresponding 21-esters of 2-methyl-6α-chloro-prednisone or its C-9α-fluoro analogue, respectively.

*Example VIII*

A mixture of 6 g. of the 21-acetate of 2α-methyl-$\Delta^4$-pregnen-17α,21-diol-3,20-dione, 6 cc. of ethyl orthoformate, 0.3 cc. of absolute ethanol and 30 cc. of anhydrous dioxane was treated with 1.5 cc. of dioxane containing 0.075 cc. of concentrated sulfuric acid. The mixture was vigorously stirred for 5 minutes, kept standing at 25° C. for 20 minutes and then treated with 3 cc. of pyridine and evaporated to dryness under reduced pressure. The residue was recrystallized from methanol containing a little pyridine, thus yielding the 21-acetate of 3-ethoxy-2α-methyl-$\Delta^{3,5}$-pregnadien-17α,21-diol-20-one.

A mixture of 5 g. of the above compound, 100 cc. of acetone, 20 cc. of water and 2 g. of sodium acetate was cooled to 0° C. and mixed with 1.8 g. of N-chlorosuccinimide followed by 2 cc. of glacial acetic acid. The mixture was stirred at 0° C. for one hour, poured into water and the precipitate was collected, washed with water, dried and recrystallized from ether, thus giving the 21-acetate of 2α-methyl-6β-chloro-$\Delta^4$-pregnen-17α,21-diol-3,20-dione.

A slow stream of dry hydrogen chloride was introduced for 2 hours into a solution of 4.5 g. of the above compound in 100 cc. of glacial acetic acid keeping the temperature below 18° C. The mixture was diluted with ice water and the precipitate formed was collected, washed with water, dried and recrystallized from acetone-hexane, thus furnishing the 21-acetate of 2α-methyl-6α-chloro-$\Delta^4$-pregnen-17α, 21-diol-3,20-dione.

4 g. of the above compound was mixed with 200 cc. of anhydrous t-butanol, 1.6 g. of selenium dioxide and 0.8 cc. of pyridine. The mixture was refluxed under nitrogen for 72 hours, filtered through celite, washed with 80 cc. of hot t-butanol and the combined filtrate and washing was evaporated to dryness under reduced pressure. The residue was dissolved in acetone, treated with decolorizing charcoal and anhydrous sodium sulfate, filtered and evaporated to dryness. Chromatographic purification of the residue on neutral alumina produced the 21-acetate of 2 - methyl - 6α - chloro - $\Delta^{1,4}$-pregnadien-17α,21-diol-3, 20-dione.

A mixture of 3 g. of this acetate and 30 cc. of absolute methanol was cooled to 0° C. and treated with a solution of sodium methoxide prepared by dissolving 210 mg. of sodium metal in 15 cc. of absolute methanol. The reagent was added dropwise, with stirring under an atmosphere of nitrogen and keeping the temperature around 0° C. The stirring was continued for half an hour at 0° C. and the mixture was then poured into 100 cc. of ice cold saturated aqueous solution of sodium chloride containing 0.5 cc. of acetic acid and the precipitate formed was collected, washed with water, dried and recrystallized from acetone-hexane. There was thus obtained the free 2-methyl - 6α - chloro - $\Delta^{1,4}$ - pregnadien - 17α,21-diol-3,20-dione.

The above compound was incubated with a recent culture of *Curvularia lunata* which had been prepared in the following manner: 1 lt. of a sterilized medium of 20 g. of peptone and 50 cc. of corn syrup was mixed with 30 cc. of a growing culture of *Curvularia lunata* N.R.R.L. 2380 which had been prepared in a medium of the same composition by inoculation with an aqueous suspension rich in spores of *Curvularia lunata*; this suspension had been prepared from a culture of the fungus in an agar medium. The mixture was then stirred for 48 hours at 28° C. with aeration. At the end of this time the pH of the culture varied from 3.0 to 4.0 and there was an abundant growth of the fungus.

To each half a liter of the culture thus obtained there was added 33 cc. of a 1% ethanol solution of 2α-methyl-6α - chloro - $\Delta^{1,4}$-pregnadien-17α,21-diol-3,20-dione. The mixture was again stirred with aeration at 28° C. for 48 hours and then extracted several times with methylene dichloride. The extract was washed with water, dried over anhydrous sodium sulfate, filtered and concentrated to a small volume under reduced pressure, avoiding overheating. The concentrated solutions obtained from several similar incubations were combined and chromatographed on silica. Elution of the column with mixtures of chloroform-ether furnished crystalline fractions which were combined and recrystallized from acetone-hexane, thus giving the pure 2-methyl-6α-chloro-prednisolone.

*Example IX*

By the same method of saponification described in the previous example there was saponified the 21-acetate of 2α-methyl-6α-chloro-Δ⁴-pregnen-17α,21-diol-3,20-dione to the free 2α-methyl-6α-chloro-Δ⁴-pregnen-17α,21-diol-3,20-dione.

The above compound was then incubated with a growing culture of *Curvularia lunata*, in accordance with the method described in Example VIII, thus producing 2α-methyl-6α-chloro-hydrocortisone.

A mixture of 1 g. of 2α-methyl-6α-chloro-hydrocortisone, 10 cc. of pyridine and 1 cc. of propionic anhydride was kept overnight at room temperature and then poured into water. The precipitate was collected by filtration, washed with water, dried and recrystallized from acetone-hexane, thus yielding the 21-propionate of 2α-methyl-6α-chloro-hydrocortisone.

By subsequent refluxing of the above compound with selenium dioxide, in accordance with the method of dehydrogenation described in Example VIII, there was obtained the 21-propionate of 2-methyl-6α-chloro-prednisolone.

*Example X*

By the method to that of the previous Example, 2-methyl-6α-chloro-prednisolone, the final compound of Example VIII, was esterified by reaction with acetic anhydride to produce the 21-acetate of 2-methyl-6α-chloro-prednisolone.

*Example XI*

By the method of Example IX, there was esterified both 2α-methyl-6α-chloro-hydrocortisone and 2-methyl-6α-chloroprednisolone at C-21 by conventional reaction with acid anhydrides or chlorides including the cyclopentylpropionate and benzoate.

We claim:
1. A process for the production of 2-methyl-6α-chloroprednisone compounds comprising reacting 2α-methyl-cortisone acetate with a lower alkyl formate to form the corresponding 3-enol ether, reacting the ether with hypochlorous acid to form the corresponding acetate of a 2α-methyl-6β-chloro-cortisone compound, inverting the 6β-chloro group by reaction with hydrogen chloride to a 6α-chloro group and dehydrogenating at C-1(2) the 6α-chloro compound by refluxing with selenium dioxide.

2. The process of claim 1 wherein the compounds have a 9α-fluoro group.

3. A process for the production of 2α-methyl-6α-chloroprednisolone compounds comprising forming the 3-enol ether of 2α-methyl-"S" acetate with a lower alkyl formate to form the corresponding 3-enol ether, reacting the ether with hypochlorous acid to form 2α-methyl-6β-chloro-"S" acetate, inverting the 6β-chloro group by reaction with hydrogen chloride to a 6α-chloro group, adding an 11β-hydroxy group and dehydrogenating at C-1(2) by refluxing with selenium dioxide.

4. 2α-methyl-6α-chloro-9α-fluoro-cortisone.

5. The 21-mono hydrocarbon carboxylic acid esters of less than 12 carbon atoms of 2α-methyl-6α-chloro-9α-fluoro-cortisone.

6. 2-methyl-6α-chloro-9α-fluoro-prednisone.

7. The 21-mono hydrocarbon carboxylic acid esters of less than 12 carbon atoms of 2-methyl-6α-chloro-9α-fluoro-prednisone.

8. The 21-acetate of 2α-methyl-9α-fluoro-3-ethoxy-Δ³,⁵-pregnadien-17α,21-diol-11,20-dione.

9. The 21-acetate of 2α-methyl-6β-chloro-cortisone.

10. The 21-acetate of 2α-methyl-6β-chloro-9α-fluoro-cortisone.

11. A compound of the following formula:

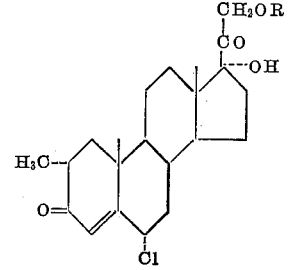

wherein R is selected from the group consisting of hydrogen and a hydrocarbon carboxylic acyl group of less than 12 carbon atoms.

12. 2α-methyl - 6α - chloro-Δ⁴-pregnen-17α,21-diol-3,20-dione.

13. The 21-mono hydrocarbon carboxylic acid esters of less than 12 carbon atoms of 2α-methyl-6α-chloro-Δ⁴-pregnen-17α,21-diol-3,20-dione.

14. The 21-acetate of 2α-methyl-6β-chloro-Δ⁴-pregnen-17α,21-diol-3,20-dione.

References Cited in the file of this patent
UNITED STATES PATENTS

| | | |
|---|---|---|
| 2,835,667 | Ercoli et al. | May 20, 1958 |
| 2,857,406 | Herzog | Oct. 21, 1958 |

FOREIGN PATENTS

| | | |
|---|---|---|
| 766,708 | Great Britain | Apr. 16, 1958 |